United States Patent [19]
Waldbillig

[11] 3,923,930
[45] Dec. 2, 1975

[54] GRAFT POLYMERS AND LUBRICANT COMPOSITIONS THEREOF

[75] Inventor: James O. Waldbillig, Wappingers Falls, N.Y.

[73] Assignee: Texaco Inc., New York, N.Y.

[22] Filed: Oct. 30, 1974

[21] Appl. No.: 519,381

Related U.S. Application Data

[62] Division of Ser. No. 351,914, April 18, 1973, Pat. No. 3,879,304.

[52] U.S. Cl. ............................ 260/878 R; 260/80.78
[51] Int. Cl.² ............... C08L 47/00; C08F 210/18; C08F 255/06
[58] Field of Search ..................... 260/878 R, 80.78

[56] References Cited
UNITED STATES PATENTS

| | | | |
|---|---|---|---|
| 3,226,326 | 12/1965 | Lorenson et al. | 260/878 R |
| 3,423,367 | 1/1969 | Merijan et al. | 260/878 R |
| 3,622,652 | 11/1971 | McDonel et al. | 260/878 R |
| 3,639,513 | 2/1972 | Sadakata et al. | 260/878 R |
| 3,779,963 | 12/1973 | Ancker et al. | 260/878 R |

*Primary Examiner*—Alan Holler
*Attorney, Agent, or Firm*—T. H. Whaley; C. G. Ries; Robert A. Kulason

[57] ABSTRACT

A graft polymer and lubricating oil compositions thereof, said polymer functioning as a multipurpose lube oil additive having viscosity index improving properties, pour depressing properties and detergent-dispersant properties, said graft polymer comprising an oil soluble substantially linear hydrocarbon terpolymer backbone having grafted thereon polymethacrylate polymers, said terpolymer backbone composed of ethylene, terminally unsaturated straight chain alkene of 3 to 12 carbons and terminally unsaturated non conjugated diolefin of 5 to 8 carbons, said polymethacrylate graft being composed of monomer member(s) seleected from the group consisting of (1) N,N-dialkylaminoalkyl methacrylate, (2) a mixture of $C_{10}$–$C_{15}$ alkyl methacrylate and $C_{16}$–$C_{20}$ alkyl methacrylate and (3) a mixture of "(1)" and "(2)".

3 Claims, No Drawings

GRAFT POLYMERS AND LUBRICANT COMPOSITIONS THEREOF

This is a division of application Ser. No. 351,914, filed Apr. 18, 1973, now U.S. Pat. No. 3,879,304.

BACKGROUND OF INVENTION

Lubricating oils of present day internal combustion engines contain a multitude of additives functioning as detergent-dispersants, viscosity index (VI) improvers, oxidation inhibitors, pour depressors, oiliness agents, etc. in order to meet the demands placed thereon. A widely used class of additives are the polymers of one or more alkyl methacrylates and/or a dialkylaminoalkyl methacrylate finding principal use as combination viscosity index improvers and pour depressants. Another class of additives widely used in lubricating oils are the type described in U.S. Pat. No. 3,691,078, namely, the linear interpolymers of ethylene and a comonomer selected from the group consisting of monoolefins of 3 to 10 carbons, omega-phenyl-1-alkenes of 5 to 10 carbons, 2-norborene, terminally unsaturated, non conjugated diolefins of 5 to 8 carbons, dicyclopentadiene, 5-methylene-2-norborene and mixtures thereof. They have been found useful as viscosity index improvers. However, the advent of high speed automotive engines coupled with increased engine operating temperatures and increased complexity of antipollution devices associated with automotive engines has resulted in a substantial increase in additive quantities in automotive lubricating oils to meet today's and tomorrow's requirements. The quantities of employed additives are now fast reaching a point of being so large as to negatively affect the primary mission of the lubricating oil, that is, to lubricate. One answer to this problem is to develop lube oil additives having multi-properties, i.e., to develop a single additive which can satisfy many or all the requirements of the petroleum engine oil. With such an additive, the quantity of overall additive employed in the lubricating oil base stock can be substantially reduced since a single unit quantity will fulfill multiple requirements rather than multiple unit quantities fulfilling said multiple requirements.

DESCRIPTION OF THE INVENTION

I have discovered and this constitutes my invention a novel graft polymer which when incorporated in a mineral lubricating oil in amounts of between about 0.1 and 10 wt. % functions as a triproperty additive, namely, as a viscosity index improver, a pour point depressor and detergent-dispersant. The novel graft polymer comprises an oil soluble substantially linear hydrocarbon terpolymer backbone composed of between about 15 and 75 wt. % ethylene, between about 25 and 85 wt. % terminally unsaturated straight chain alkene of 3 to 12 carbons and between about 0.10 and 15 wt. % terminally unsaturated non conjugated diolefins of 5 to 8 carbons, said backbone having an average chain length of between about 700 and 7,000 carbons having recurringly grafted on said backbone polymerized monomer member selected from the group consisting of (1) a 10:1 to 1:10 weight ratio mixture of $C_{10}$–$C_{15}$ alkyl methacrylate and $C_{16}$–$C_{20}$ alkyl methacrylate, (2) dialkylaminoalkyl methacrylate of the formula:

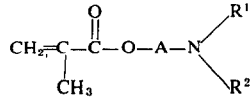

where $R^1$ and $R^2$ are alkyl of 1 to 2 carbons and A is a divalent alkylene radical (alkadiyl) of from 2 to 4 carbons and (3) mixtures thereof, said graft polymer having an inherent viscosity of between about 0.6 and 1.9 as a 0.10 wt. % solution in tetrachloroethylene at 30°C. and having a weight ratio of backbone component to said graft component of between about 1000:1 and 1:10.

The graft polymers of the invention are prepared by the metallation techniques set forth by Tate et al, "Metallation of Unsaturated Polymers and Formation of Graft Copolymers", Journal of Polymer Science, Vol. 9, pages 139–145. More specifically, the method is a two stage procedure:

The first stage comprises contacting an oil soluble substantially linear terpolymer consisting of between about 15 and 75 wt. % ethylene, between about 25 and 85 wt. % terminally unsaturated straight chain alkene of 3 to 12 carbons and between about 0.10 and 15 wt. % terminally unsaturated non conjugated alkadiene of 5 to 8 carbons, said linear terpolymer reactant having an average carbon chain length of between about 700 and 7000 and an inherent viscosity of between about 0.6 and 1.9 at 0.10 wt. % solution in tetrachloroethylene at 30°C. with an alkyl lithium of from 3 to 10 carbons in the presence of a liquid alkane as solvent of from 5 to 10 carbons and N,N,N',N'-tetralkylalkylene diamine promoter wherein said alkyl and alkylene moieties in said diamine are from 1 to 4 carbons to form a lithiated terpolymer intermediate, that is, a terpolymer having lithium atoms attached along the linear chain. The first stage contacting is conducted under anhydrous conditions (less than 0.01 wt. % water) and is an inert atmosphere, e.g., nitrogen and at a temperature between about 20° and 100°C., normally for a period of between 1 and 25 hours. The first stage contacting is further employing between about 1.0 and 200 mmoles alkyl lithium/100 g. of linear terpolymer and a mole ratio of alkyl lithium to diamine promoter of between about 0.40 and 2.0.

In the second stage the lithiated linear hydrocarbon terpolymer intermediate is then contacted with a methacrylate monomer member selected from the group consisting of (1) a mixture of $C_{10}$–$C_{15}$ alkyl methacrylate and $C_{16}$–$C_{20}$ alkyl methacrylate in a weight ratio of between about 1:10 and 10:1, (2) dialkylaminoalkyl methacrylate of the formula:

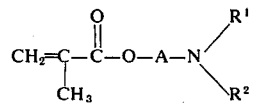

where $R^1$ and $R^2$ are alkyl of 1 to 2 carbons and A is alkadiyl of from 2 to 4 carbons, and (3) mixtures of (1) and (2) at a temperature between about −100° and 100°C. under anhydrous conditions and in an inert atmosphere utilizing a weight ratio of lithiated intermediate to total methacrylate reactant of between about 0.2:1 and 1000:1. The reaction period in the second stage is normally between about 0.5 and 24 hours.

The graft polymer product is recovered from the final reaction mixture by standard means: adding a lower alkanol from 1 to 4 carbons, e.g., in quantities of between about 0.1 and 10 wt. % of the reaction mixture to destroy the alkyl lithium and diamine promoter followed by washing the solution with dilute aqueous mineral acid, (e.g., 5–10 wt. % aq. HCl) and then with water followed, if desired, by further standard purification techniques such as precipitation.

In the first stage of the reaction, lithium moieties are randomly placed along the terpolymer chain, the lithiated locations being where the polymethacrylate graft component attaches via replacement of the lithium moieties.

Examples of the alkene component in the terpolymer reactant include propylene, 1-butene, 1-pentene, 1-hexene, 1-heptene, 1-octene, 1-nonene, 1-decene, and 1-dodecene. Suitable alkadiene components in said terpolymer reactant include, 1,4-pentadiene, 1,4-hexadiene, 1,5-hexadiene, 2-methyl-1,5-hexadiene, 1,6-heptadiene and 1,7-octadiene. Preferably, the terpolymer is derived from about 40 to 55 wt. % ethylene, about 40 to 60 wt. % propylene and about 1 to 5 wt. % 1,4-hexadiene and of a carbon chain length of between about 800 and 5000. Most preferably, the terpolymer reactant contains 50.5 wt. % ethylene, 46 wt. % propylene and 3.5 wt. % 1,4-hexadiene and of a carbon chain length of between about 900 and 2600.

In regard to the acrylate reactants contemplated herein, examples of the $C_{10}$–$C_{15}$ alkyl methacrylates are decyl methacrylate, undecyl methacrylate, dodecyl methacrylate, pentadecyl methacrylate and mixtures of the alkyl methacrylates in the defined 10 to 15 carbon alkyl carbon atom range. Mixtures are formed in the alkyl methacrylate monomer manufacture when commercial alcohols are employed since the commerical alcohols themselves are mixtures of adjacent and closely adjacent homologs with normally one chain length predominating.

Specific examples of the $C_{16}$–$C_{20}$ alkyl methacrylates contemplated herein are hexadecyl methacrylate, heptadecyl methacrylate, octadecyl methacrylate, nonadecyl methacrylate, eicosyl methacrylate and mixtures of the alkyl methacrylates in the defined 16 to 20 alkyl carbon range.

In regard to the dialkylaminoalkyl methacrylates, examples are the N,N-dimethylaminoethyl methacrylate, N,N-diethylaminoethyl methacrylate, N,N-dimethylaminopropyl methacrylate and N,N-diethylaminopropyl methacrylate.

Examples of alkyl lithium are butyl lithium, hexyl lithium, octyl lithium and decyl lithium.

Examples of N,N,N,',N'-tetraalkylalkylene diamine are N,N,N',N'-tetramethylethylene diamine, N,N,N',N'-tetramethylpropylene diamine, N,N,N',N'-tetramethylbutylene diamine, and N,N,N',N'-tetrabutylmethylene diamine.

Examples of suitable inert reaction solvents are hexane, cyclohexane and heptane.

In the lubricating oil compositions contemplated herein, the graft polymer normally constitutes between about 0.1 and 10 wt. % of the composition, preferably between about 0.5 and 5 wt. %. Also contemplated are the concentrates thereof wherein the graft polymer product content is between about 10 and 50 wt. %. Concentrates are formulated for ease of handling, storage and transportation. The finished lubricating oil compositions are prepared from the concentrates via dilution with additional base oil.

The hydrocarbon base oils employed in major amounts in the finished lubricating oil compositions are derived from a wide variety of hydrocarbon base oil materials such as naphthenic base, paraffinic base and mixed base mineral oils or other hydrocarbon products such as synthetic hydrocarbon oils, e.g., polyalkylenes such as polypropylene, polyisobutylene of a molecular weight of about 250 and 2500. Advantageously, the base oils employed in the finished lubricating compositions have an SUS viscosity at 100°F. of between about 50 and 2000, preferably between about 75 and 375.

Surprisingly, the graft polymer products of the invention have been found to be effective detergent-dispersants in addition to pour depressors and VI improvers when incoporated in the contemplated lubricant compositions. It is surprising because terpolymer component functions only as VI improver. Further, the graft component, namely, the polymethacrylate functions only as VI improver and pour depressor. Neither the terpolymer backbone nor polymethacrylate alone of in physical admixture evidence detergent-dispersant properties. Therefore, it is unexpected that when these two components are chemically bound in the graft polymer of the invention as defined a new property surfaces, namely, detergent-dispersancy.

In the finished lubricating oil compositions of the invention, additional additives such as supplementary detergent-dispersants, oxidation inhibitors, corrosion inhibitors, anti-foamants, etc. may be employed in addition to the graft polymer.

Examples of the supplementary detergent-dispersants contemplated herein are the ethylene oxide derivatives of inorganic phosphorus acid free, steam hydrolyzed polyisobutene (700–5000 m.w.)-$P_2S_5$ reaction product; and overbased calcium alkyl aromatic sulfonate having a total base number at least about 300; and sulfurized normal calcium alkylphenolate. These supplementary detergent-dispersants are disclosed in U.S. Pat. Nos. 3,087,956, 3,549,534 and 3,537,966.

Examples of suitable antioxidants contemplated herein are zinc and calcium dialkyl dithiophosphates and diaryl dithiophosphates, the alkylated diphenyl amines, sulfurized alkylated diphenylamines, unsulfurized and sulfurized alkylphenols, phenolates and hindered phenols.

Examples of suitable corrosion inhibitors are zinc dialkyl dithiophosphate, zinc diaryl dithiophosphate, basic calcium, barium and magnesium sulfonates; calcium, barium and magnesium phenolates.

A widely used antifoamant can be included in the finished compositions of the invention, namely, the dimethyl silicone polymers normally employed in amounts of between about 1 and 1000 ppm.

The following examples further illustrate the invention but are not to be construed as limitations thereof.

EXAMPLE I

There was dissolved in 750 mls. of dry cyclohexane 50 grams of a terpolymer of ethylene, propylene and 1,4-hexadiene. The weight ratio of ethylene:propylene:hexadiene in the terpolymer was 50:46:4. Further, the terpolymer reactant had an intrinsic viscosity of 1.1 as 0.10 wt. % in tetrachloroethylene at 30°C., approximately one mole of unsaturation per 2000 grams of terpolymer, and a carbon chain length of about 1500.

The polymer solution was added to a flame dried 1-liter resin flask equipped with a high speed stirrer. Dry nitrogen was bubbled through the solution during the entire reaction. To the nitrogen bubbled solution there was charged 16.3 mls. (0.03 mole) of a 15 wt. % solution of butyl lithium in cyclohexane. During the addition, the temperature was maintained at 30°C. and introduction of the butyl lithium was accomplished via a hypodermic syringe. There was then added to the resultant solution 5.3 mls. (0.035 mole) of N,N,N',N'-tetramethylethylene diamine and the resultant solution was then heated and maintained at 50°C. with continued nitrogen bubbling for a period of 4 hours. The reaction mixture was then cooled to 25°C. and a mixture of 9.6 grams (0.038 mole) of a mixture of alkyl methacrylate derived from a synthetic alkanol having a carbon distribution ranging principally from $C_{12}$ to $C_{15}$ in a weight ratio of $C_{12}:C_{13}:C_{14}:C_{15}$ of 8:7:7:5. In addition there was added 5.5 grams (0.013 mole) of an alkyl methacrylate derived from a synthetic alkanol mixture of principally $C_{16}$ to $C_{18}$ alcohols in a weight ratio of $C_{16}:C_{17}:C_{18}$ of about 45:6:22. The addition of the methacrylates was accomplished with a hypodermic syringe. The temperature was then raised to 50°C. over a period of 1 hour and maintained at 50°C. for an additional hour. At the end of the hour reaction period 10 mls. of isopropyl alcohol was added to destroy the tetramethylethylene diamine promoter. A 50 mls. sample of the reaction solution was washed twice with 150 mls. of 10 wt. % aqueous hydrochloric acid and twice with 200 mls. portions of water. The graft polymer product solution was then precipitated in boiling isopropyl acetate and redissolved in a small amount of toluene, then filtered and precipitated a second time in boiling isopropyl acetate. The recovered solid polymer was then washed in boiling isopropyl alcohol. Infrared examination of the polymer products showed it to be a graft polymer composed of an ethylene-propylene-hexadiene backbone having copolymer grafts thereon of $C_{12}$–$C_{15}$ alkylmethacrylate and $C_{16}$–$C_{18}$ alkylmethacrylate.

The remaining polymer reaction solution was precipitated in 2000 mls. of boiling methanol, redissolved in about 600 mls. of toluene then precipitated in 200 mls. of boiling acetone. The solid polymer was treated with boiling acetone and dried at 100°C. (0.05 mm Hg) and 45.3 grams of graft polymer were recovered.

EXAMPLE II

This example illustrates the preparation of a second species of the graft polymer.

The procedure of Example I was repeated with the exception that 2.67 grams of N,N-dimethylaminoethyl methacrylate was substituted for the alkyl methacrylate mixture reactants of Example I. There was recovered 21.7 grams of graft polymer product identified as a polymer consisting of an ethylene-propylene-1,4-hexadiene terpolymer backbone having grafts thereon of poly-N,N-dimethylaminoethyl methacrylate, said graft polymer having a nitrogen content of 0.039 wt. %.

EXAMPLE III

This example illustrates the lubricating oil compositions of the invention, the effectiveness of the graft polymer as a multiple purpose additive, namely, as a VI improver, pour depressor and detergent-dispersant, and further demonstrates the unexpectedness of the detergent-dispersant property thereof.

The base oil employed in all the representative and comparative lubricating oil formulations was a paraffinic lubricating oil having an SUS viscosity at 100°F of about 128, at 210°F. of about 41.5, a maximum pour point of 0°F. and a minimum viscosity index of 95.

The polymers employed in the representative and comparative lubricating oil compositions are as follows:

1. Representative Polymer A is the graft copolymer of Example I.
2. Representative Polymer B is the graft copolymer prepared in Example II.
3. Comparative Polymer C is the ethylene-propylene 1,4-hexadiene terpolymer reactant employed in Examples I and II.
4. Comparative Polymer D is the copolymer prepared by the polymerization of the $C_{12}$ to $C_{15}$ alkyl methacrylate and the $C_{16}$ to $C_{18}$ alkyl methacrylate monomers in a 75/25 wt. % ratio.

The representative and comparative lubricant compositions were formulated by standard means, specifically mixing the test polymers in the base oil at a temperature of about 65°C.

In addition to measuring the viscosity, pour point and viscosity index of the various formulations, the lubricant compositions were also tested for their detergent-dispersancy utilizing a Bench Sludge Test as described as follows:

The Bench Sludge Test measuring the detergent properties of the additive comprises introducing into a 20 cc bottle portions of the test oil composition, titanium oxide (6 wt. %) in oil, aqueous and hydrocarbon engine "blow-by". The bottles are agitated at an elevated temperature for a period of time and a portion thereof is then centrifuged and visual observations are made of the sediment depth. The depth of the sediment is measured in mm. and the higher the measurement in mm. the poorer the dispersancy characteristics of the test oil composition. The following table describes the various representative and comparative lubricating oil compositions and test measurements thereof:

TABLE I

| Ingredients Wt. % | Composition | | | | | | |
|---|---|---|---|---|---|---|---|
| | AA | BB | CC | DD | EE | FF | GG |
| Polymer A | 1.5 | — | — | — | — | — | — |
| Polymer B | — | 1.5 | — | — | — | — | — |
| Polymer C | — | — | 1.5 | 1.5 | — | — | — |
| Polymer D | — | 0.17 | 0.17 | — | 1.5 | 0.17 | — |
| Base Oil | 98.5 | 98.33 | 98.33 | 98.5 | 98.5 | 99.83 | 100 |
| Test | | | | | | | |
| Visc. 210°F. SUS | 68.4 | 72.8 | 67.6 | 67.6 | 50.3 | 42.2 | 41.5 |
| 100°F. SUS | 377 | 415 | 385 | 362 | 201 | 131.7 | 128 |
| Viscosity Index | 163 | 167 | 156 | 166 | 148 | 105 | 96 |
| Pour Point, °F. | −30 | −35 | −45 | 0 | −40 | −40 | 0 |

TABLE I-continued

| Ingredients Wt. % | Composition | | | | | | |
|---|---|---|---|---|---|---|---|
| | AA | BB | CC | DD | EE | FF | GG |
| Bench Sludge, mm. | 0.4 | 0.4 | 1.9 | 2.0 | 2.0 | 2.2 | 1.8 |

As can be seen from the above representative Polymers A and B impart a substantial improvement in VI, pour point and detergent dispersancy, whereas comparative Polymers C and D alone or in admixture although imparting improved VI and/or pour point have essentially no or negative detergent-dispersant properties. It is to be noted that Polymer C is the backbone component of Polymers A and B and Polymer D is essentially the graft component of Polymer A.

I claim:

1. A graft polymer consisting of a linear terpolymer backbone component of between about 15 and 75 wt. % ethylene, between about 25 and 85 wt. % terminally unsaturated alkene of 3 to 10 carbons and between about 0.1 and 15 wt. %, terminally unsaturated non conjugated alkadiene of from 5 to 8 carbons having grafts thereon of a polymethacrylate composed of monomer selected from the group consisting of (1) a mixture of first alkyl methacrylate of 14 to 19 carbons and a second alkyl methacrylate of 20 to 24 carbons in a respective weight ratio of between about 10:1 and 1:10, (2) dialkylaminoalkyl methacrylate characterized by the formula:

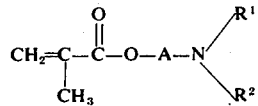

where $R^1$ and $R^2$ are alkyl of from 1 to 2 carbons and A is alkadiyl of from 1 to 5 carbons, and (3) a mixture of (1) and (2), said backbone component to said graft component being present in a weight ratio in said graft polymer of between about 1000:1 and 1:10, said linear terpolymer backbone component having a carbon chain length of between about 700 and 7,000 carbons.

2. A graft polymer in accordance with claim 1 wherein said alkene is propylene, said alkadiene is 1,4-hexadiene and said polymethacrylate is a copolymer of a first alkyl methacrylate of from 16 to 19 carbons, and a second methacrylate of from 20 to 22 carbons.

3. A graft polymer in accordance with claim 1 wherein said alkene is propylene, said alkadiene is 1,4-hexadiene and said monomer is N,N-dimethylaminoethyl methacrylate.

* * * * *